UNITED STATES PATENT OFFICE.

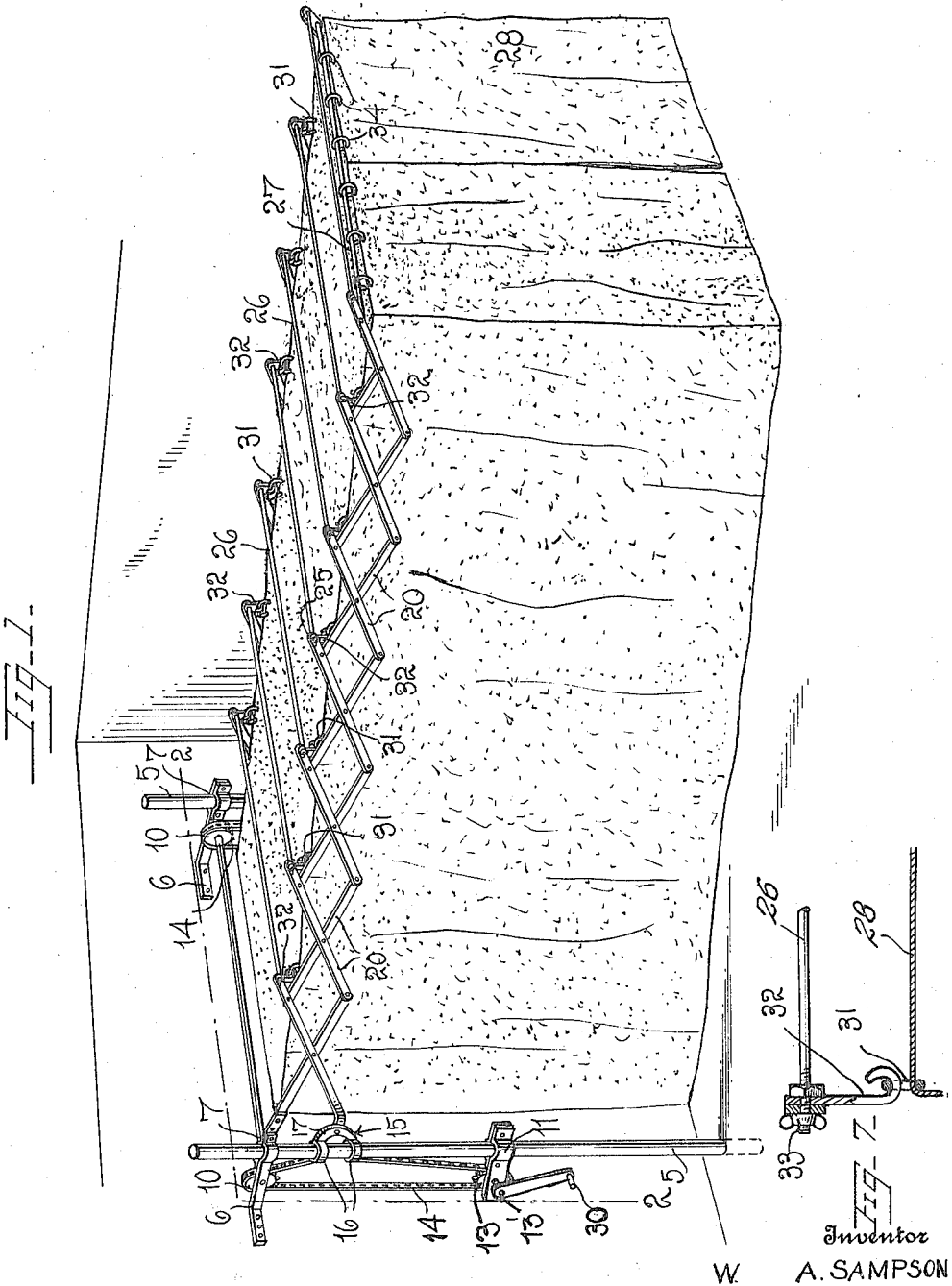

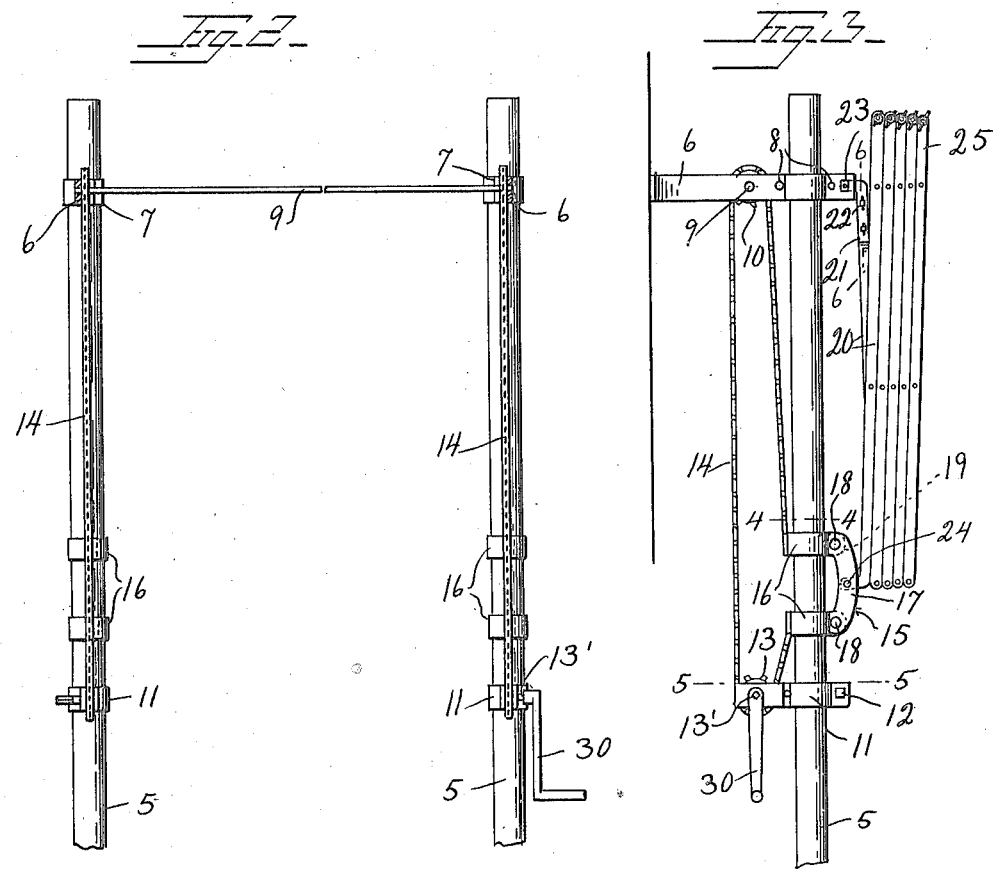

WILLIAM A. SAMPSON, OF WINDSOR, MISSOURI.

VEHICLE-COVER.

1,257,535.     Specification of Letters Patent.     Patented Feb. 26, 1918.

Application filed January 31, 1917. Serial No. 145,742.

*To all whom it may concern:*

Be it known that I, WILLIAM A. SAMPSON, a citizen of the United States, residing at Windsor, in the county of Henry and State of Missouri, have invented certain new and useful Improvements in Vehicle-Covers, of which the following is a specification, reference being had to the accompanying drawings.

This invention relates to a vehicle cover or protecting device and has for its primary object to provide a foldable canopy or cover for inclosing and protecting an automobile or similar vehicle while in storage.

The invention has for a more particular object to provide improved means for mounting and supporting a flexible cover, whereby the same may be easily and quickly extended to entirely inclose the vehicle, and as easily folded into a relatively small space.

It is another object of the invention to provide a device for the above purpose embodying an extensible frame or support to which the cover is attached, and manually operable means mounted in a relatively stationary position and to which one end of the frame is connected, whereby the frame may be extended or folded.

With the above and other objects in view, my invention consists in the novel features of construction, combination and arrangement of parts to be hereinafter more fully described, claimed and illustrated in the accompanying drawings, in which, Figure 1 is a perspective view showing the improved vehicle cover or canopy in extended position;

Fig. 2 is a section taken on the line 2—2 of Fig. 1;

Fig. 3 is a side elevation showing the cover frame folded;

Fig. 4 is a detail section taken on the line 4—4 of Fig. 3;

Fig. 5 is a similar view taken on the line 5—5 of Fig. 3;

Fig. 6 is a detail section taken on the line 6—6 of Fig. 3; and

Fig. 7 is a detail sectional view showing the means for suspending the cover or canopy from the foldable supporting frame.

In the preferred embodiment of my invention, spaced, cylindrical standards or uprights 5 are suitably fixed or anchored at their lower ends in the floor of the garage or other structure. These standards are braced at their upper ends by means of the horizontal bracket arms 6 securely fixed to one of the side walls of the building at one of their ends, each of said brace bars being provided with a semi-circular, curved seat for one of the standards, adjacent to its other end. A bearing or clamping plate 7 is engaged upon the opposite side of the standard and secured to the bar 6 by means of the bolts or rivets 8. The outer end portions of the bar 6 and the clamping plate 7 are spaced apart for a purpose which will presently appear.

In the bar 6, in spaced relation to the standards 5, a transversely extending shaft 9 is journaled at its ends, and upon each end of said shaft, inwardly of the bar 6, the sprocket wheels 10 are fixed.

The bearing or support is also fixed to each of the standards 5, said bearing including horizontally disposed bars 11 engaged against opposite sides of the standard and securely clamped thereto by bolts or rivets 12. These bars at one of their ends are spaced apart to accommodate the sprocket wheel 13, the axis of which, indicated at 13', is rotably mounted in said bars. The sprocket wheels 13 are connected to the upper sprocket wheels 10 by means of the chains 14.

In the opposite ends of the metal bar 15, sleeves 16 are formed for loose, sliding engagement upon the standard 5. One of these bars is mounted upon each standard, and the intermediate portion of the bar is bowed or curved, as indicated at 17. To the sleeves 16, the spaced ends of the respective chains are fixed, as clearly shown in Fig. 1 of the drawings. The terminals of the bars 15 are spaced from the curved portions thereof and connected to the intermediate portion of the bar by means of the rods or bolts 18. Upon each of these bolts, a roller 19 is rotatably mounted. These rollers have rolling contact upon the standards 5 so as to reduce frictional resistance to a minimum and permit the sleeves 16 to slide freely on the standards.

The frame for the canopy or cover consists of two lazy tongs 20. One of the levers at one end of each lazy tong has an adjustable end section shown at 21, provided with spaced slots to receive threaded bolts 22 fixed in said lever, upon which clamping nuts are engaged. The terminal of the lever section 21 is pivotally secured between the spaced ends of the bars 6 and 7 by means of the bolts 23. The corresponding end lever of the respective lazy tongs is pivoted, as at 24, to the curved, intermediate section of one of the bars 15. By the provision of the adjustable lever sections 21, the lazy tongs may be projected to the desired position at right angles to the standards 5 in case the standards are not exactly perpendicular, or said lazy tongs may be projected in an upwardly or downwardly inclined direction with respect to the standards.

The corresponding spaced levers in each lazy tongs are projected at one of their ends beyond the terminals of the other levers to which they are pivotally connected, as shown at 25, and these projecting ends of the levers in the spaced lazy tongs are connected by transverse rods 26. A transverse wire 27 is disposed in spaced relation to the rod 26 at the outer ends of the lazy tongs, and connects the corresponding tong levers.

The cover or canopy 28 of canvas or other suitable flexible material, has its top wall disposed below the transverse rods 26, and at the juncture of the side walls with the longitudinal edges of this top wall, a plurality of rings or eyes 31 are suitably secured. These rings are adapted for detachable engagement with the hooks or other suitable hangers 32 depending from the ends of the rods 26 inwardly of the tong levers. Wing nuts 33 are threaded upon the extremities of the rods 26 for engagement against the outer sides of the tong levers. The front wall of the cover 28, at its upper edge, is separate from the top wall and is in two sections, each of said sections being provided with a series of rings 34 at its upper edge which are strung upon the transverse rod 27. The rear ends of the side walls and the top wall of the cover extend between the standards 5 to the face of the building wall, as shown in Fig. 1. The lazy tongs are disposed exteriorly of the cover walls so that when the same are collapsed or folded, they will not interfere with the folding of the cover.

In the use of the invention, it will be understood that after the machine has been disposed in the proper position adjacent to the standards 5, a suitable crank indicated at 30 is applied to one end of the sprocket shaft 13'. Upon the rotation of the sprocket, the chain 14 is moved around the sprockets 13 and 10 and the sliding bars 15 are moved upwardly upon the respective standards from the position shown in Fig. 3. In this movement of the bars 15, it is manifest that the levers of the lazy tongs will be extended in the usual manner and, as seen in Fig. 1, the cover or canopy will be projected outwardly over the vehicle, the portion of the cover disposed between the lazy tongs covering the top of the vehicle, while the side portions extend downwardly around the sides of the vehicle. After the lazy tongs have thus been extended, the front vertical portions of the cover are drawn together at the top along the wire 27. Thus, the vehicle will be completely housed or inclosed by the cover and protected from the effects of dust, dirt and moisture. The cover may also be easily and quickly folded or collapsed into a very small space by simply reversing the rotation of the sprocket wheel 13, whereby the lazy tongs are folded to the positions seen in Fig. 3. It is understood, of course, that the front vertical walls of the cover are first opened or moved in opposite directions along the wire 27.

From the foregoing description, taken in connection with the accompanying drawings, the construction and manner of operation of the apparatus will be clearly and fully understood. It will be seen that I have devised a very simple and effective device whereby the protecting cover or canopy may be arranged over the vehicle, with a minimum of manual labor and with loss of but little time. While I have herein shown and described the preferred means for mounting and arranging the lazy tongs, it is manifest that other supporting means for these tongs whereby they may be properly actuated, can be provided. The invention is also susceptible of considerable modification in the form, proportion and arrangement of the several elements employed and it will, therefore, be understood that I reserve the privilege of adopting all such legitimate changes as may be fairly embodied within the spirit and scope of the invention as claimed.

Having thus fully described my invention, what I desire to claim and secure by Letters Patent is:

1. In an apparatus of the character described, a foldable cover adapted to inclose a vehicle, spaced horizontally extensible supports disposed exteriorly of the cover, means connecting the supports and from which the cover is suspended, and manually operable means to extend the supports and position the vehicle cover around the vehicle, or to fold said cover to an inoperative position.

2. An apparatus of the character described including spaced supports, a vertically slidable member on each of said supports, spaced lazy tongs operatively connected at one end to the respective slidable members, transverse rods connecting the corresponding pivoted members of the spaced tongs, a cover detachably suspended at spaced points from said rods, said cover having side walls disposed between and extending below the lazy tongs, and manually operable means connected to the slide members to move the same and extend or fold the lazy tongs.

In testimony whereof I hereunto affix my signature in the presence of two witnesses.

WILLIAM A. SAMPSON.

Witnesses:
S. R. SHIKLES,
Mrs. MABEL SAMPSON.